S. A. DUNCAN.
PORTABLE STOVE.
APPLICATION FILED NOV. 20, 1918.
1,325,694.
Patented Dec. 23, 1919.
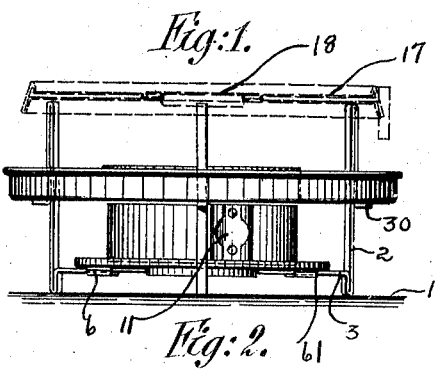
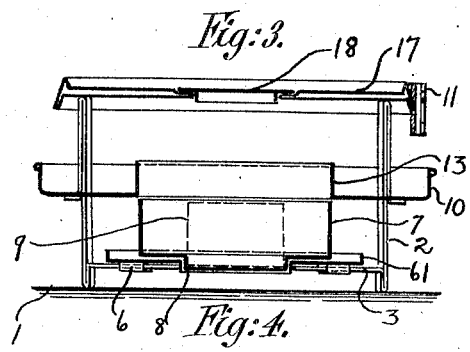
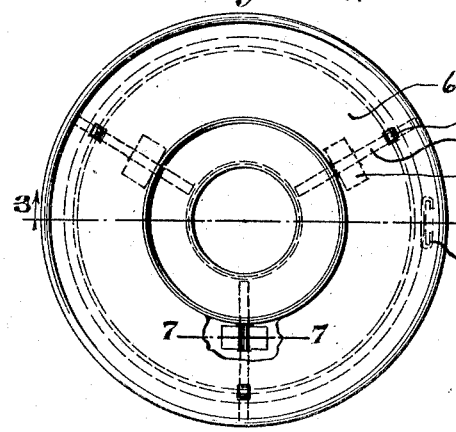
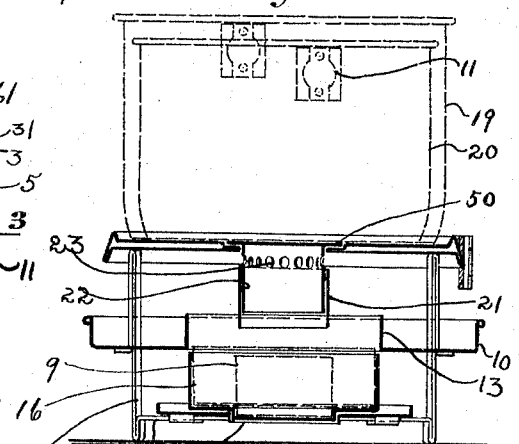
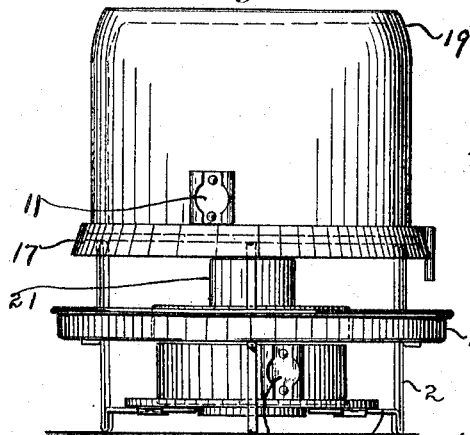
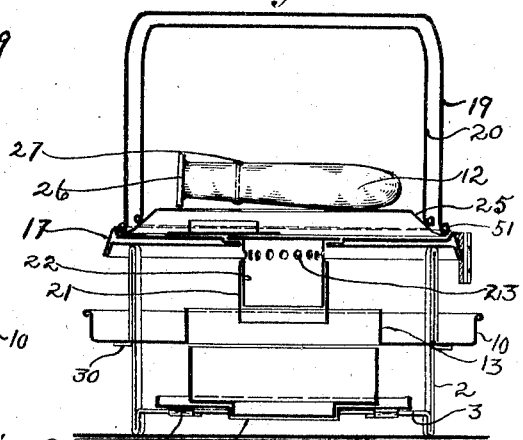
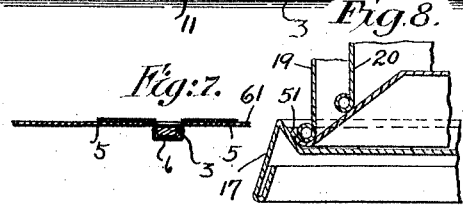
INVENTOR
Sylvan A. Duncan
BY
ATTORNEYS

UNITED STATES PATENT OFFICE.

SYLENA A. DUNCAN, OF NESHANIC STATION, NEW JERSEY.

PORTABLE STOVE.

1,325,694.  Specification of Letters Patent.  Patented Dec. 23, 1919.

Application filed November 20, 1918. Serial No. 263,266.

*To all whom it may concern:*

Be it known that I, SYLENA A. DUNCAN, a citizen of the United States, residing at Neshanic Station, in the county of Somerset and State of New Jersey, have invented certain new and useful Improvements in Portable Stoves, of which the following is a specification.

My invention relates to a portable and compact cooking outfit which can be utilized for baking, frying, stewing, and the like.

One of the objects of my invention is to provide an outfit which can be stored or carried in a very small space and yet furnish a large number of utensils.

Another object of my invention is to afford a convenient and efficient means of regulating the heat.

Other objects of my invention will be disclosed in the following description and drawings which illustrate a preferred embodiment thereof:

Figure 1 is an elevation.

Fig. 2 is a plan view.

Fig. 3 is a section on the line 3—3 of Fig. 2.

Fig. 4 is the same as Fig. 3 and shows the pots in position for cooking.

Fig. 5 is an elevation showing parts of the apparatus nested together.

Fig. 6 is a central vertical section of Fig. 5.

Fig. 7 is a section on the line 7—7 of Fig. 2. Fig. 8 is a detail sectional view.

A series of uprights 2 which are bent into a U-shape at their bottoms and have horizontal extensions 3 support the entire apparatus. These horizontal extensions 3 fit into the slot in the heater carrier 61. The heater carrier 61 has rectangular holes of substantially the same width as the horizontal supports 3 stamped out therefrom and U-shaped pieces 5 are soldered to the support 61 so as to form guides 6 in which the horizontal extensions 3 can slide to and fro. As can be seen, the upper ends of the uprights 2 are also bent to a U-shape and are provided with horizontal limbs 30. The heater support 61 is of substantially disklike shape and has the shape shown in the drawings, and has a perforation 14 into which the bottom 8 of the vessel 7 can fit. This vessel 7 may be called the heater-container because it contains a can of alcohol or other similar substance, which burns with a hot flame, and which preferably is in the form of a paste or jelly. These cans containing alcohol in the form of a paste are well-known, and require no further description. The bottom 8 of the vessel 7 is of sufficient width to contain a small can 9 of the alcohol, and a large can 16 can also fit therein, as is shown in Fig. 4.

A chimney-like vessel 10 is provided with perforations 31, which can fit over the uprights 2, so that the vessel 10 can rest upon the horizontal limbs 30. The central portion of the vessel 10 is struck up to form the chimney 13, which may be of any suitable height and directs the flame upwardly.

A baking vessel 17 having a central perforation which may be closed by a cap 18 is adapted to rest on top of the uprights 2. When the cap 18 is in place the baking vessel 17 may be used for baking biscuits, or the like, or for any similar purpose. When the cap 18 is removed, cooking vessels 19 or 20 may be supported on the baking vessel 17, and may serve for making soup, stews, or the like, and generally speaking the vessel 17 can then be used exactly like the top of a stove.

For further regulating the heat when the cap 18 is removed a heat regulator consisting of a tube 22, having perforations 23 and a flange 50 of substantially the same diameter as the cap 18, and having an outer tube 21 which fits over the tube 22 may be utilized. The tube 21 fits over the tube 22 so tightly, that while one can be slid upon the other the fit is so tight that the friction between the tubes 21 and 22 will always keep them in the relative position in which they are placed by the hand.

By pushing the tube 21 up and down with respect to tube 22 so as to close the holes 23 to any desired extent, the heat communicated to any vessels placed upon the vessels 17 can be regulated.

The various vessels are provided with jaws 11 by means of which they can be gripped, preferably by a handle 12. The combination of these jaws 11 and the handle 12 is fully described in my copending application filed the 20th day of November, 1918, bearing the Ser. No. 263,267 and it is sufficient to state that the handle 12 has two limbs pivoted at 27, which have heads 26. When the limbs of the handle 12 are forced together, the ends of the limbs in front of the pivot 27 fit into the circular depressions in the jaws 11, while the heads 26 also tightly clamp against these jaws so as to enable the vessel to be readily manipulated. To withdraw the handle 12 it is only necessary to allow its limbs to spring apart, when the handle becomes disengaged from the vessel.

An additional disk 25 perforated at its center is provided and this is provided with an upturned marginal flange 51 that rests adjacent the upturned marginal flange of the vessel 17 as can be seen in Fig. 6, so that the heat may be further regulated and baking may be performed upon it when it is in the position shown in Fig. 6.

As can be seen in Figs. 5 and 6 the flange of the larger and outer vessel 19 fits against the upturned flange of the disk 25 as well as against the upturned flange of the vessel 17 so that by arranging the parts as shown in Fig. 6 the entire apparatus is nested into a very compact form and can be readily stored or transported.

An apparatus of this character is very valuable for military purposes and generally speaking for persons who must cook in small space.

I have described a preferred embodiment of my invention but it is clear that numerous changes could be made in its details to which I do not wish to be limited.

For example, the heat regulating device 21 and 22 may be as wide as desired, being preferably of sufficient width to receive all the heated gases arising from the burning alcohol paste.

I claim:—

1. In a cooking outfit, a plurality of uprights having U-shaped bends at their tops and bottoms, the said U-shaped bends having horizontal extensions, means for supporting a source of heat resting on the bottom extensions, chimney means resting on the upper of said extensions, and a vessel resting on the tops of the said supports and adapted to hold the objects to be cooked.

2. In a cooking outfit, a source of heat, a heater carrier adapted to carry said source of heat having horizontal guides therein, uprights having U-shaped bends at their tops and bottoms, the said U-shaped bends being extended to form horizontal extensions, the bottom extensions fitting into the guides of the said heater carrier and supporting it, a chimney-like vessel having its central part shaped like a chimney and being perforated so as to enable the said uprights to be passed through the perforations, the said chimney-like vessel resting on the upper horizontal extensions.

3. In a cooking outfit, a source of heat, means for supporting the vessel to be heated at a point above the source of heat and heat regulating means intermediate the said supporting means and the said source of heat and spaced from both of them, said heat regulating means comprising a tube having a series of perforations, and another tube slidable thereon and adapted to close the said perforations to any desired extent, the said two tubes being sufficiently spaced from the said source of heat so that the air has access to the combustible material found in the source of heat.

In testimony whereof I hereunto affix my signature.

SYLENA A. DUNCAN.